United States Patent [19]

Danjushevsky et al.

[11] 3,921,717

[45] Nov. 25, 1975

[54] METHOD FOR CEMENTING WELLS

[76] Inventors: Solomon Isaakovich Danjushevsky, ploschad Chernyshevskogo, 7, kv. 79; Rakhil Izrailevna Liogonkaya, Novo-Izmailovsky prospekt, 53, kv. 10; Lev Girshovich Sudakas, ulitsa Shelgunova, 15, kv. 6, all of Leningrad, U.S.S.R.

[22] Filed: Jan. 23, 1975

[21] Appl. No.: 543,517

Related U.S. Application Data

[62] Division of Ser. No. 378,638, July 12, 1973.

[52] U.S. Cl. .................. 166/292; 106/117; 106/121
[51] Int. Cl.² ... E21B 33/14; C04B 7/16; C04B 9/00
[58] Field of Search ...... 166/292, 281, 285, DIG. 1; 106/85, 117, 121

[56] References Cited

UNITED STATES PATENTS

| 1,318,076 | 10/1919 | Grunwald | 166/292 |
|---|---|---|---|
| 1,456,667 | 5/1923 | Berry | 106/85 |
| 2,049,882 | 8/1936 | Witty | 106/117 |
| 2,822,873 | 2/1958 | Stuve et al. | 166/292 |

Primary Examiner—Stephen J. Novosad
Assistant Examiner—George A. Suckfield
Attorney, Agent, or Firm—Haseltine, Lake & Waters

[57] ABSTRACT

The present invention relates to building materials.

Offered for the cementing of wells at a temperature of 100° to 200°C and a pressure not over 1000 atm is a binder which includes blast-furnace slag, quartz sand and magnesium oxide with a refractive index between 1.722 and 1.734.

2 Claims, No Drawings

METHOD FOR CEMENTING WELLS

This application is a Divisional application of Ser. No. 378,638 filed July 12, 1973.

The present invention relates to building materials, and more specifically relates to binders used in cementing bore wells.

The present invention may be used to advantage in cementing oil and gas wells as well as other wells at a temperature of 100° to 200°C and under a pressure not over 1,000 atm.

The materials used in cementing wells should meet a number of requirements such as the formation of pumpable suspensions in water or aqueous solutions of organic and inorganic compounds which neither thicken nor set and harden at a temperature of 100° to 200°C and a pressure not over 1,000 atm within the time interval required to complete the plugging; on hardening said materials should form a stone with good strength, durability and limited water and gas permeability.

It is known that high-alumina binding materials, such as aluminous cement, are quite unsuitable for cementing wells at a temperature of 100° to 200°C and under a pressure not over 1,000 atm whereas highly basic silicate binding materials, such as portland cement, are suitable for the same purpose only to a limited extent, the reasons being short life of the structures formed and difficulties experienced in controlling the setting time of said binders.

At present there is known a binder suitable for cementing wells at a temperature of 100° to 200°C and a pressure not over 1,000 atm, said binder being based on low-basicity silicates, such as granulated blast-furance slag and bellite slurries of various kind, added to which can possibly be quartz sand.

Common for binders finding application in cementing wells at a temperature of 100° to 200°C and a pressure not over 1000 atm is a disadvantage consisting in the fact that the binder decreases in volume while hardening. Since the linear shrinkage may reach 2 percent, this may lead to impaired sealing of the well and provoke the formation of voids in the annular space, resulting in losses of petroleum or gass or in flooding of the well.

It is an object of the present invention to provide such a binder for cementing wells at a temperature of 100° to 200°C and a pressure not over 1,000 atm which will provide for the improvement of the conditions of sealing the well.

Said object is attained by the fact that the binder for cementing wells which includes blast-furnace slag also contains, in accordance with the invention, magnesium oxide with a refractive index between 1.722 and 1.734 taken in an amount between 5 and 10 wt. percent.

The use of the binder of a composition disclosed herein enables relible sealing of wells so as to improve the well yield and the quality of the product obtained.

It is expedient that the binder dislcosed herein also contains quartz sand in an amount not over 60 wt percent. The presence of quartz sand in the binder disclosed reduces the reactivity of cementing mixture, improving thereby the properties of the binder at elevated temperatures.

Other object and advantages of the present invention are apparent from the following detailed description of the invention and the examples of its embodiment.

We propose to introduce magnesium oxide into the binder for the cementing of wells at a temperature of 100° to 200°C and a pressure not over 1000 atm, said binder being prepared from blast-furnace slag with a possible addition of quartz sand.

The presence of magnesium oxide in the binder as a component is conducive to an increase in the volume of the hardening mass of the binder in the course of hydration, mainly by virtue of the crystallization processes involved in the formation of magnesium hydroxide. Apart from that, the magnesium hydrosilicate forming under said conditions also adds to the volume of binder.

To obtain the result desired, it is of importance to maintain the rate of chemical change during the process of hydration in agreement with the rate at which the formation of the structure of cement stone takes place. If the hydration of the magnesium oxide introduced is a rapid one occuring too early, the result will be an insignificant one since the hydration of magnesium oxide and all the crystallyzation processes involved will take place in a mobile phase, which a suspension actually is, without affecting the volume. On the other hand, a retarded process of magnesium oxide hydration may bring about excessive straining of the cement stone which has formed, resulting in fracturing and eventual disintegration of the stone.

We have found that the appropriate relationship between the rate of chemical change during the hydration of magnesium oxide and the rate at which the formation of the structure of cement stone takes place depends on the condition of the magnesium oxide introduced, said condition being controlled by the refractive index.

We propose to use magnesium oxide with a refractive index between 1.722 and 1.734.

The use of a binder containing magnesium oxide with a refractive index between 1.722 and 1.734 in addition to other components makes the hermetic cementing of wells at a temperature of 100° to 200°C and a pressure not over 1,000 atm a practical possibility.

The amount of magnesium oxide to be introduced is governed by the necessity to obtain a pronounced expanding effect on one hand so that this brings the lowest limit down to 5 wt. percent; on the other hand, a magnesium oxide content exceeding 10 wt percent impairs the mechanical strength of concrete stone so that it becomes inadequate.

In some cases it is preferable to introduce not more than 60 wt percent of quartz sand into the binder used for cementing wells at a temperature ob 100° to 200°C and a pressure not over 1,000 atm in order to reduce the overall reactivity of cementing mass and to increase the durability of cement stone.

We prefer to use a binder with the ingredients ground so that retained on a sieve with 4,900 meshes per square centimetre are between 10 and 20 percent of the particles.

EXAMPLE 1

A binder in an amount of 200 t was obtained by grinding 180 t of granulated blast-furnace slag with 20 t of magnesium oxide, using a ball mill. The fineness of grinding was characterized by the fact that retained on a sieve with 4,900 meshes per square centimetre were 15.4 percent of the particles. The binder so obtained had been tested at a temperature of 150°C and a pressure of 400 atm. The results of the tests were as follows:

flexural strength (after 48 hours), 26 kg/cm²;
setting time (with retarder), 1 hr 45 min;
linear expansion, 0.4 percent.

EXAMPLE 2

A binder in an amount of 1 t was obtained by grinding 360 kg of granulated blast-furnace slag with 540 kg of quartz sand and 100 kg of magnesium oxide. The fineness of grinding was characterized by the fact that retained on a sieve with 4,900 meshes per square centimetre were 12.2 percent of the particles. The binder so obtained had been tested at a temperature of 200°C and a pressure of 700 atm. The results of the tests were as follows:

flexural strength (after 48 hours), 44 kg/cm²;
setting time (with retarder), 2 hrs;
linear expansion, 0.2 percent.

What is claimed is:

1. In a method for cementing wells with an aqueous binder at a temperature of 100°–200°C and under a pressure not exceeding 1000 atm, the improvement comprising pumping into the well an aqueous suspension of a binder consisting essentially of blast-furnace slag and between 5 and 10 weight percent of magnesium oxide having a refractive index between 1.722 and 1.734.

2. A method according to claim 1 wherein the binder further includes quartz sand as a component in an amount not exceeding 60 weight percent.

* * * * *